United States Patent
Morita et al.

(10) Patent No.: US 10,155,450 B2
(45) Date of Patent: Dec. 18, 2018

(54) CHARGING DEVICE, VEHICLE, VEHICLE CHARGING SYSTEM, CHARGING METHOD, AND PROGRAM

(71) Applicant: MITSUBISHI HEAVY INDUSTRIES ENGINEERING, LTD., Kanagawa (JP)

(72) Inventors: Katsuaki Morita, Tokyo (JP); Hisashi Motoyama, Tokyo (JP); Kyotaro Onishi, Tokyo (JP); Masato Suzuki, Tokyo (JP); Takayuki Kono, Tokyo (JP); Kazuyuki Wakasugi, Tokyo (JP)

(73) Assignee: MITSUBISHI HEAVY INDUSTRIES ENGINEERING, LTD., Kanagawa (JP)

( * ) Notice: Subject to any disclaimer, the term of this patent is extended or adjusted under 35 U.S.C. 154(b) by 71 days.

(21) Appl. No.: 14/908,110

(22) PCT Filed: Oct. 24, 2014

(86) PCT No.: PCT/JP2014/078349
§ 371 (c)(1),
(2) Date: Jan. 27, 2016

(87) PCT Pub. No.: WO2015/068596
PCT Pub. Date: May 14, 2015

(65) Prior Publication Data
US 2016/0200203 A1    Jul. 14, 2016

(30) Foreign Application Priority Data
Nov. 5, 2013    (JP) .................. 2013-229277

(51) Int. Cl.
*B60L 11/18*    (2006.01)
*B60L 3/00*    (2006.01)
*B60L 3/04*    (2006.01)

(52) U.S. Cl.
CPC ......... *B60L 11/1809* (2013.01); *B60L 3/0069* (2013.01); *B60L 3/04* (2013.01);
(Continued)

(58) Field of Classification Search
CPC .............. B60L 11/1809; B60L 11/1811; B60L 11/1824; B60L 2230/00; B60L 2250/10;
(Continued)

(56) References Cited

U.S. PATENT DOCUMENTS

2010/0019570 A1* 1/2010 Kade ....................... B60R 16/03
307/10.1
2011/0057611 A1* 3/2011 Nakaso ................. B60W 20/15
320/109

(Continued)

FOREIGN PATENT DOCUMENTS

JP    5-300661 A    11/1993
JP    2010-238576 A    10/2010
(Continued)

OTHER PUBLICATIONS

International Search Report in PCT/JP2014/078349, dated Dec. 9, 2014.

(Continued)

*Primary Examiner* — Jeffrey C Boomer
(74) *Attorney, Agent, or Firm* — Kanesaka Berner and Partners, LLP (57) ABSTRACT

This charging device is provided with a charger, a resistor, a ground-side switch, and a determination device. The charger charges a secondary battery that is provided to a vehicle. The resistor is connected in parallel with the charger. The ground-side switch connects the charger and the resistor in an openable/closable manner. The determination device acquires information indicating that the ground-side switch is closed and information indicating that a vehicle- (Continued)

side switch that connects the secondary battery and the charger in an openable/closable manner is open and subsequently determines that the vehicle-side switch is short-circuited when a physical quantity that relates to the electricity of the resistor does not decrease.

7 Claims, 4 Drawing Sheets

(52) U.S. Cl.
CPC ....... B60L 11/1811 (2013.01); B60L 11/1824 (2013.01); *B60L 2200/18* (2013.01); *B60L 2230/00* (2013.01); *B60L 2250/10* (2013.01); *Y02T 10/7005* (2013.01); *Y02T 10/7088* (2013.01); *Y02T 90/14* (2013.01)

(58) Field of Classification Search
CPC ............. B60L 2200/18; Y02T 10/7005; Y02T 10/7088; Y02T 90/14
See application file for complete search history.

(56) References Cited

U.S. PATENT DOCUMENTS

| | | | | |
|---|---|---|---|---|
| 2011/0140656 A1* | 6/2011 | Starr | ................... | B60L 11/1816 320/109 |
| 2013/0113495 A1* | 5/2013 | Kim | ................... | G01R 31/3606 324/434 |
| 2013/0127414 A1* | 5/2013 | Ohtomo | ............... | B60L 3/0069 320/109 |
| 2013/0134936 A1* | 5/2013 | Kaneyasu | ............... | B60R 16/00 320/109 |
| 2013/0193874 A1* | 8/2013 | Takahashi | ............... | G05F 1/468 315/297 |
| 2014/0095005 A1* | 4/2014 | Kanzaki | ............. | B60L 11/1803 701/22 |
| 2014/0186664 A1* | 7/2014 | Park | ........................ | B60L 11/18 429/61 |
| 2014/0232182 A1* | 8/2014 | Kinomura | ............. | B60L 11/123 307/10.1 |
| 2014/0306659 A1* | 10/2014 | Nakajima | ........... | B60L 11/1846 320/109 |
| 2014/0368211 A1* | 12/2014 | Inoue | .................... | B60L 3/0069 324/509 |
| 2016/0152154 A1* | 6/2016 | Mizuno | ................. | B60L 3/0069 307/10.1 |
| 2016/0167541 A1* | 6/2016 | Stimm | .................. | B60L 3/0046 701/22 |
| 2016/0214496 A1* | 7/2016 | Iwai | .................... | B60L 11/1846 |

FOREIGN PATENT DOCUMENTS

| | | |
|---|---|---|
| JP | 2011-109794 A | 6/2011 |
| JP | 2011-205755 A | 10/2011 |
| JP | 2012-53821 A | 3/2012 |
| JP | 2013-55844 A | 3/2013 |
| JP | 2013-198379 A | 9/2013 |
| WO | 2012/99052 A1 | 7/2012 |

OTHER PUBLICATIONS

Written Opinion in PCT/JP2014/078349, dated Dec. 9, 2014.
Office Action in JP Application No. 2013-229277, dated Jan. 12, 2016.

\* cited by examiner

CHARGING DEVICE, VEHICLE, VEHICLE CHARGING SYSTEM, CHARGING METHOD, AND PROGRAM

RELATED APPLICATIONS

The present application is a National Phase of PCT/JP2014/078349, filed Oct. 24, 2014, and claims priority based on Japanese Patent Application No. 2013-229277, filed on Nov. 5, 2013.

TECHNICAL FIELD

The present invention relates to a charging device, a vehicle, a vehicle charging system, a charging method, and a program.

BACKGROUND ART

A vehicle, such as a plug-in hybrid vehicle, on which a secondary battery is mounted includes a charging device which receives power from an external power supply and charges the secondary battery.

PTL 1 describes a technique in which a vehicle includes a charging device, and a resistor is provided to discharge the electric charge stored in a capacitor of the charging device when the charging of the secondary battery is stopped. PTL 1 describes a technique in which a vehicle includes a charging device, and a resistor is provided to check welding of a relay cutting off the secondary battery from the charging device when the charging of the secondary battery is stopped.

CITATION LIST

Patent Literature

[PTL 1] Japanese Unexamined Patent Application Publication No. 2011-205755

SUMMARY OF INVENTION

Technical Problem

However, in the vehicle including the charging device described in PTL 1, there is a possibility that manufacturing costs of the vehicle may be increased, fuel efficiency may be degraded due to the weight of the charging device, and the space inside the vehicle may be narrowed.

The invention provides a charging device, a vehicle, a vehicle charging system, a charging method, and a program capable of detecting short-circuiting of a vehicle-side switch, reducing manufacturing costs of a vehicle, improving fuel efficiency, and enlarging the space inside the vehicle.

Solution to Problem

According to a first aspect of the invention, a charging device includes a charger, a resistor, a ground-side switch, and a determination device. The charger charges a secondary battery of a vehicle. The resistor is connected in parallel with the charger. The ground-side switch connects the charger and the resistor in an openable/closable manner. The determination device acquires information indicating that the ground-side switch is closed and information indicating that a vehicle-side switch connecting the secondary battery and the charger in an openable/closable manner is open, and then determines that the vehicle-side switch is short-circuited when a physical quantity relating to electricity of the resistor does not decrease.

According to a second aspect of the invention, the charger of the charging device includes a voltage conversion circuit and a capacitor. The voltage conversion circuit converts an AC voltage to a DC voltage. The capacitor smoothes the DC voltage converted by the voltage conversion circuit.

According to a third aspect of the invention, the charger of the charging device includes a voltage conversion circuit and a capacitor. The voltage conversion circuit converts a DC voltage to a DC voltage different from this DC voltage. The capacitor smoothes the DC voltage converted by the voltage conversion circuit.

According to a fourth aspect of the invention, the determination device of the charging device outputs a command signal for separating a contact intermediating the connection of the charger and the secondary battery from the secondary battery when it is determined that the vehicle-side switch is short-circuited.

According to a fifth aspect of the invention, a vehicle includes a control device. The control device performs control for separating the secondary battery of the vehicle when a determination device of an external charging device determines that a vehicle-side switch of the vehicle is short-circuited.

According to a sixth aspect of the invention, the vehicle further includes a communication unit, a battery management unit, and a host controller. The communication unit performs communication with a communication unit of the charging device. The battery management unit manages the secondary battery. The host controller outputs a control signal to the battery management unit based on a command signal received by the communication unit.

According to a seventh aspect of the invention, a vehicle charging system includes a charging device and a vehicle. The charging device includes a charger, a resistor, a ground-side switch, and a determination device. The charger charges a secondary battery of the vehicle. The resistor is connected in parallel with the charger. The ground-side switch connects the charger and the resistor in an openable/closable manner. The determination device acquires information indicating that the ground-side switch is closed and a vehicle-side switch connecting the secondary battery and the charger in an openable/closable manner is open, and then determines that the vehicle-side switch is short-circuited when a physical quantity relating to electricity of the resistor does not decrease. The vehicle includes a control device. The control device performs control for separating the secondary battery of the vehicle when the determination device determines that the vehicle-side switch of the vehicle is short-circuited.

According to an eighth aspect of the invention, there is provided a charging method for a charging device. The charging device includes a charger which charges a secondary battery of a vehicle, a resistor which is connected in parallel with the charger, and a ground-side switch which connects the charger and the resistor in an openable/closable manner. The charging method includes acquiring information indicating that the ground-side switch is closed and information indicating that a vehicle-side switch connecting the secondary battery and the charger in an openable/closable manner is open, and then determining that the vehicle-side switch is short-circuited when a physical quantity relating to electricity of the resistor does not decrease.

According to a ninth aspect of the invention, a program causes a computer of a charging device to function as determination means for acquiring information indicating that a ground-side switch connecting a charger for charging a secondary battery of a vehicle and a resistor connected in parallel with the charger in an openable/closable manner is closed and a vehicle-side switch connecting the secondary battery and the charger in an openable/closable manner is open, and determining that the vehicle-side switch is short-circuited when a physical quantity relating to electricity of the resistor does not decrease.

Advantageous Effects of Invention

According to the charging device, the vehicle, the vehicle charging system, the charging method, and the program described above, it is possible to detect short-circuiting of the vehicle-side switch, to reduce manufacturing costs of the vehicle, to improve fuel efficiency, and to enlarge the space inside the vehicle.

DESCRIPTION OF EMBODIMENTS

Hereinafter, an embodiment will be described referring to the drawings.

First, a first embodiment will be described.

Figure 1:
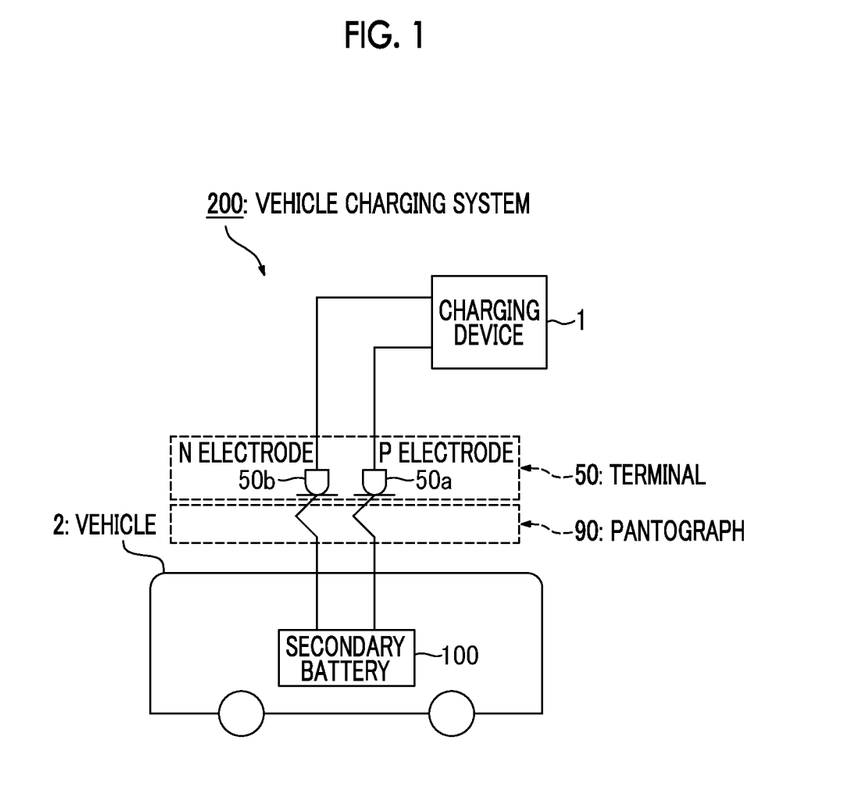
FIG. 1 is a diagram showing an example of a vehicle charging system according to a first embodiment of the invention.

FIG. 1 is a diagram showing an example of a vehicle charging system 200 according to a first embodiment of the invention.

The vehicle charging system 200 of the first embodiment has a charging device 1 including a terminal 50, and a vehicle 2 including a pantograph 90.

FIG. 1 shows a state where the vehicle 2 of the first embodiment receives power from the charging device 1 installed at a bus stop.

The vehicle 2 stops at a bus stop so as to allow an occupant to get on or off the vehicle. The charging device 1 is installed at the bus stop. The charging device 1 includes a terminal 50 which supplies power to the outside. The vehicle 2 stops at a predetermined location in the bus stop, whereby the pantograph 90 of the vehicle 2 can be brought into contact with the terminal 50 of the charging device 1. The pantograph 90 and the terminal 50 are brought into contact with each other, whereby the vehicle 2 can receive power from the charging device 1.

Figure 2:
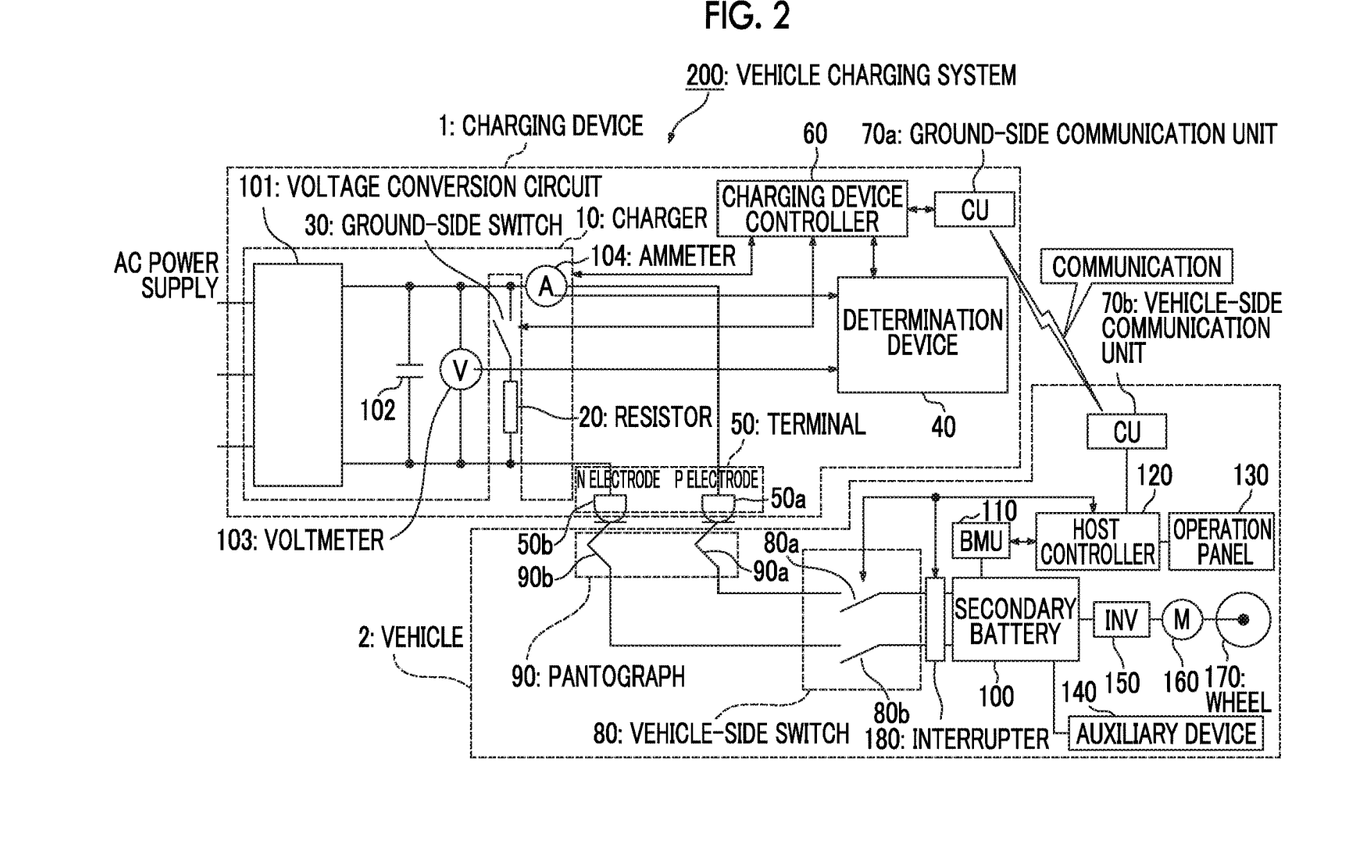
FIG. 2 is a diagram showing an example of the configuration of a charging device and a vehicle according to the first embodiment of the invention.

FIG. 2 is a diagram showing an example of the configuration of the charging device 1 and the vehicle 2 according to the first embodiment of the invention.

The charging device 1 includes a charger 10, a resistor 20, a ground-side switch 30, a determination device 40, a terminal 50, a charging device controller 60, and a ground-side communication unit 70a.

The vehicle 2 includes a vehicle-side communication unit 70b, a vehicle-side switch 80, a pantograph 90 (90a, 90b), a secondary battery 100, a battery management unit 110, a host controller 120, an operation panel 130, an auxiliary device 140, a drive inverter 150, a drive motor 160, wheels 170, and an interrupter 180.

The charger 10 of the charging device 1 includes a voltage conversion circuit 101, a capacitor 102, a voltmeter 103, and an ammeter 104.

The terminal 50 has a P-electrode terminal 50a and an N-electrode terminal 50b.

The voltage conversion circuit 101 of the charger 10 converts an AC voltage to a DC voltage. The voltage conversion circuit 101 outputs the converted DC voltage through the terminal 50a and the terminal 50b. For example, the voltage conversion circuit 101 converts an AC voltage output from a commercial AC power supply to a predetermined AC voltage using a transformer. The voltage conversion circuit 101 converts the converted AC voltage to a DC voltage for charging the secondary battery 100 using a rectifier circuit.

The capacitor 102 of the charger 10 is connected between the P electrode-side output and the N electrode-side output of the voltage conversion circuit 101. The capacitor 102 smoothes the DC voltage converted by the voltage conversion circuit 101.

The voltmeter 103 of the charger 10 is connected in parallel with the capacitor 102. The voltmeter 103 measures a voltage applied to the capacitor 102. The voltmeter 103 outputs the measurement result to the determination device 40.

One of the two terminals of the ammeter 104 of the charger 10 is connected to the terminal 50a. The other terminal of the ammeter 104 is connected to the P electrode-side output of the voltage conversion circuit 101. The ammeter 104 measures a current flowing in the terminal 50a. The ammeter 104 outputs the measurement result to the determination device 40.

One of the two terminals of the resistor 20 of the charging device 1 is connected to the terminal 50b. The other terminal of the resistor 20 is connected to the ground-side switch 30. The resistor 20 is an element which discharges the electric charge stored in the capacitor 102 at the time of stopping of charging of the secondary battery 100. The resistor 20 is an element which detects short-circuiting of the ground-side switch 30 as described below in detail.

One of the two terminals of the ground-side switch 30 of the charging device 1 is connected to the resistor 20. The other terminal of the ground-side switch 30 is connected to the P electrode-side output of the voltage conversion circuit 101. The ground-side switch 30 is closed at the time of stopping of charging of the secondary battery 100, whereby a path through which the electric charge stored in the capacitor 102 is discharged through the resistor 20 is formed.

The determination device 40 of the charging device 1 determines that the vehicle-side switch 80 is short-circuited. The determination device 40 acquires information that the ground-side switch 30 is closed and information that the vehicle-side switch 80 connecting the secondary battery 100 and the charger 10 in an openable/closable manner is open. In this case, the determination device 40 determines that the vehicle-side switch 80 is short-circuited when the voltage applied to the resistor 20 measured by the voltmeter 103 does not decrease.

The terminal 50 of the charging device 1 comes into contact with the pantograph 90 of the vehicle 2 and transmits power output from the charger 10 to the vehicle 2.

The P-electrode terminal 50a comes into contact with the P electrode-side pantograph 90a having corresponding polarity. The N-electrode terminal 50b comes into contact with the N electrode-side pantograph 90b having corresponding polarity.

The charging device controller 60 of the charging device 1 is connected to the charger 10, the ground-side switch 30, the determination device 40, and the ground-side communication unit 70a. The charging device controller 60 performs various kinds of control necessary when the charging device 1 charges the secondary battery 100.

The ground-side communication unit 70a of the charging device 1 performs communication with the vehicle-side communication unit 70b of the vehicle 2 when the charging device 1 charges the secondary battery 100. With the communication, various kinds of information, such as a charging start instruction indicating the start of charging output according to an operation on the operation panel 130 and the determination result regarding short-circuiting of the vehicle-side switch 80 in the determination device 40, are transmitted and received between the ground-side communication unit 70a and the vehicle-side communication unit 70b.

The vehicle-side communication unit 70b of the vehicle 2 performs communication with the ground-side communication unit 70a.

The vehicle-side switch 80 of the vehicle 2 has a P electrode-side vehicle-side switch 80a and an N electrode-side vehicle-side switch 80b. The vehicle-side switch 80a connects the pantograph 90a and the secondary battery 100. The vehicle-side switch 80b connects the pantograph 90b and the secondary battery 100.

The secondary battery 100 of the vehicle 2 is a power source for use in traveling of the vehicle 2 or an air conditioner.

The battery management unit 110 of the vehicle 2 manages the secondary battery 100.

The host controller 120 of the vehicle 2 is connected to the vehicle-side communication unit 70b, the vehicle-side switch 80, the battery management unit 110, and the operation panel 130. The host controller 120 performs various kinds of control necessary when the charging device 1 charges the secondary battery 100.

The operation panel 130 of the vehicle 2 is an operation panel which is operated by a driver to output an instruction to start charging of the secondary battery 100 by the charging device 1. The operation panel 130 is connected to the host controller 120.

The auxiliary device 140 of the vehicle 2 converts a voltage output from the secondary battery 100 to a voltage usable by an air conditioner or the like. An air conditioner (not shown) or the like is connected to the auxiliary device 140 as a load.

The drive inverter 150 of the vehicle 2 converts a voltage output from the secondary battery 100 to a voltage for driving the drive motor 160.

The drive motor 160 of the vehicle 2 operates under the control of the drive inverter 150 and drives the wheels 170.

The wheels 170 of the vehicle 2 are rotated by the driving of the drive motor 160.

The interrupter 180 of the vehicle 2 is connected to the secondary battery 100 and the vehicle-side switch 80, and is not interrupted in normal situations. The interrupter 180 is interrupted in abnormal situations, such as short-circuiting of the vehicle-side switch 80, and separates the secondary battery 100 from the vehicle-side switch 80.

Figure 3:
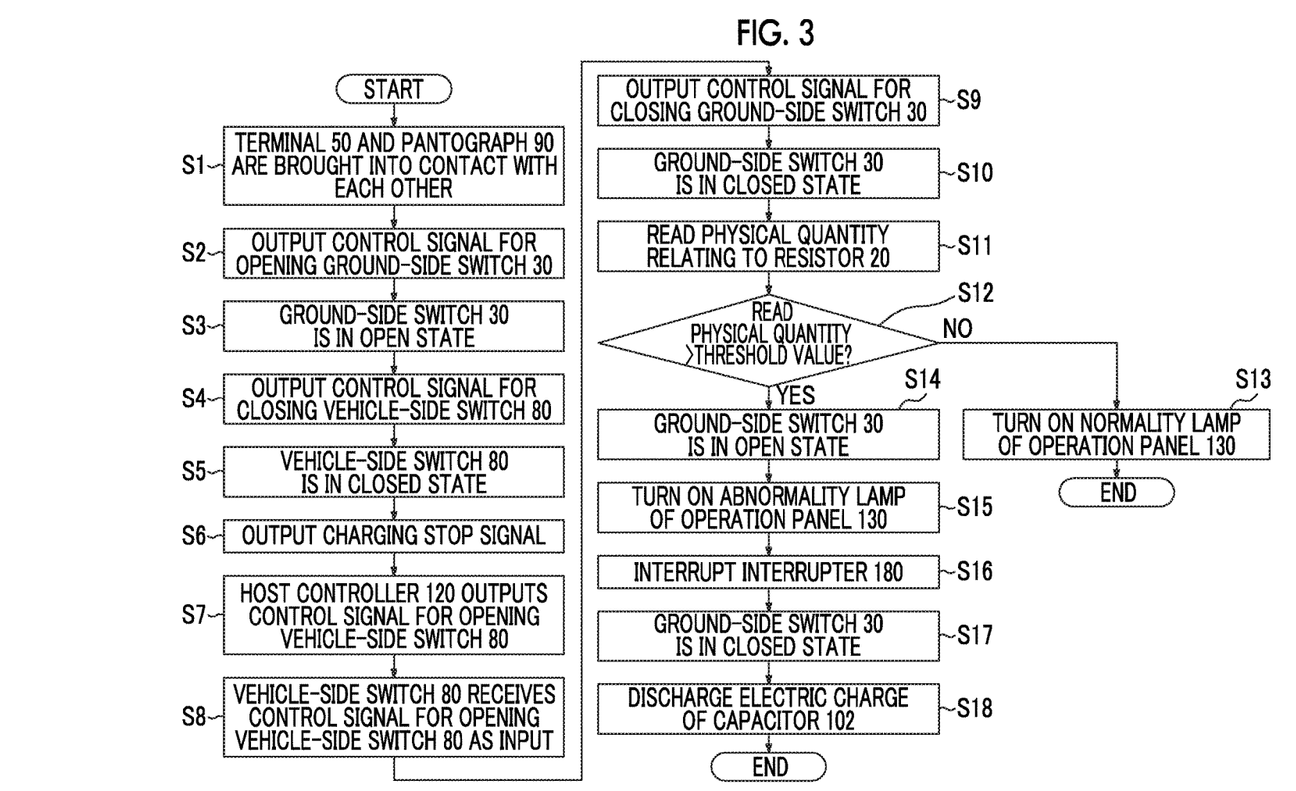
FIG. 3 is a diagram showing an example of a processing flow of the vehicle charging system according to the first embodiment.

FIG. 3 is a diagram showing an example of a processing flow of the vehicle charging system 200 of the first embodiment.

The processing flow shown in FIG. 3 is a processing flow of the vehicle charging system 200 including the charging device 1 and the vehicle 2 configured as shown in FIG. 2.

Next, the processing flow of the vehicle charging system 200 of the first embodiment will be described. Here, it is assumed that the vehicle 2 is a bus including the pantograph 90 and the charging device 1 is installed at a bus stop.

First, in the vehicle charging system 200 of the first embodiment, a processing flow in which the charging device 1 charges the secondary battery 100 of the vehicle 2 will be described.

The vehicle 2 stops at a predetermined position in the bus stop in order to charge the secondary battery 100. At this time, the pantograph 90a of the vehicle 2 comes into contact with the terminal 50a of the charging device 1, and the pantograph 90b of the vehicle 2 comes into contact with the terminal 50b of the charging device 1 (Step S1).

Here, when the driver performs an operation on the operation panel 130 to start charging of the secondary battery 100, the operation panel 130 outputs a charging start signal for instructing the host controller 120 to start charging of the secondary battery 100. If the charging start signal is input from the operation panel 130, the host controller 120 outputs a ground-side switch open signal for instructing opening of the ground-side switch 30 to the vehicle-side communication unit 70b. If the ground-side switch open signal is input from the host controller 120, the vehicle-side communication unit 70b transmits the ground-side switch open signal to the charging device 1.

If the ground-side switch open signal is received from the vehicle-side communication unit 70b, the ground-side communication unit 70a of the charging device 1 outputs the ground-side switch open signal to the charging device controller 60. If the ground-side switch open signal is input from the ground-side communication unit 70a, the charging device controller 60 outputs a ground-side switch open control signal for instructing opening of the ground-side switch 30 to the ground-side switch 30 (Step S2). The charging device controller 60 outputs, to the ground-side communication unit 70a, an open control completion signal indicating that the control for opening the ground-side switch 30 has been performed, along with the output of the ground-side switch open control signal.

The ground-side switch 30 is placed in an open state according to the ground-side switch open control signal input from the charging device controller 60 (Step S3).

If the open control completion signal is input from the charging device controller 60, the ground-side communication unit 70a transmits the open control completion signal to the vehicle-side communication unit 70b. If the open control completion signal is received from the ground-side communication unit 70a, the vehicle-side communication unit 70b outputs the open control completion signal to the host controller 120. If the open control completion signal is received from the vehicle-side communication unit 70b, the host controller 120 outputs a vehicle-side switch close control signal for instructing closing of the vehicle-side switch 80 to the vehicle-side switch 80 (Step S4).

The vehicle-side switch 80 is placed in a closed state according to a vehicle-side contact close control signal input from the host controller 120 (Step S5).

At this time, the voltage conversion circuit 101 of the charger 10 converts an AC voltage output from the AC power supply to a DC voltage for charging the secondary battery 100 and outputs the DC voltage. Then, the charger smoothes the DC voltage output from the voltage conversion circuit 101 with the capacitor 102 and outputs the DC voltage to the terminal 50. Accordingly, in the vehicle charging system 200, if the vehicle-side switch 80 is placed in the closed state by the processing of Step S5, the charging device 1 starts charging of the secondary battery 100 of the vehicle 2.

The above is the processing flow in which the charging device 1 charges the secondary battery 100 of the vehicle 2 in the vehicle charging system 200 of the first embodiment.

Next, a processing flow in which the charging device 1 detects short-circuiting of the vehicle-side switch 80 in the vehicle charging system 200 of the first embodiment will be described.

In Step S5, while the charging device 1 is charging the secondary battery 100, the battery management unit 110 manages a charging time, detects a charging current charging the secondary battery 100, a voltage of a cell constituting the secondary battery 100, or the like, and estimates a charge ratio of the secondary battery 100. Then, for example, when it is determined that the charging rate is 100%, that is, the secondary battery 100 has reached a fully charged state, the battery management unit 110 outputs a charging stop signal for stopping the charging of the secondary battery 100 to the host controller 120 (Step S6).

If the charging stop signal is input from the battery management unit 110, the host controller 120 outputs a vehicle-side switch open control signal for instructing opening of the vehicle-side switch 80 to the vehicle-side switch 80 (Step S7). The vehicle-side switch 80 receives the vehicle-side switch open control signal from the host controller 120 as input (Step S8).

On the other hand, in cases where the secondary battery 100 is charged and where the secondary battery 100 becomes a power source for use in traveling of the vehicle 2, an air conditioner, or the like, the vehicle-side switch 80 is repeatedly opened and closed. Then, the vehicle-side switch 80 may undergo incomplete contact at the time of opening and closing, a current may be concentrated at one point, and the switch may be short-circuited and may remain closed.

Accordingly, the vehicle-side switch 80 is not always opened even when the vehicle-side switch open control signal is input from the host controller 120.

The host controller 120 progresses to the processing of Step S7 and outputs a ground-side switch close signal for instructing closing of the ground-side switch 30 to the vehicle-side communication unit 70b. If the ground-side switch close signal is input from the host controller 120, the vehicle-side communication unit 70b transmits the ground-side switch close signal to the charging device 1.

If the ground-side switch close signal is received from the vehicle-side communication unit 70b, the ground-side communication unit 70a of the charging device 1 outputs the ground-side switch close signal to the charging device controller 60. If the ground-side switch close signal is input from the ground-side communication unit 70a, the charging device controller 60 outputs a ground-side switch close control signal for instructing closing of the ground-side switch 30 to the ground-side switch 30 (Step S9). The charging device controller 60 outputs, to the ground-side communication unit 70a, an open control completion signal indicating that the control for opening the ground-side switch 30 has been performed, along with the output of the ground-side switch close control signal. The ground-side switch 30 is placed in a closed state according to the ground-side switch close control signal input from the charging device controller 60 (Step S10).

Here, the determination device 40 reads a voltage detected by the voltmeter 103 as a physical quantity relating to electricity of the resistor 20 (Step S11).

In Step S8, when the vehicle-side switch 80 inputs the vehicle-side switch open control signal, and when at least one of the vehicle-side switches 80a and 80b can be opened, the terminal 50a is opened. Accordingly, in this case, the resistor 20 discharges the electric charge of the capacitor 102 through the ground-side switch 30. Then, the voltage detected by the voltmeter 103 is gradually decreased, and when the electric charge of the capacitor 102 is completely discharged, the voltmeter 103 indicates 0 volts.

In Step S8, when the vehicle-side switch 80 inputs the vehicle-side switch open control signal, and when both the vehicle-side switches 80a and the 80b cannot be opened, that is, both the vehicle-side switches 80a and 80b are short-circuited, a loop can be formed along a path of the ammeter 104, the terminal 50a, the vehicle-side switch 80a, the secondary battery 100, the vehicle-side switch 80b, the terminal 50b, the resistor 20, and the ground-side switch 30. Accordingly, the voltmeter 103 indicates a voltage value output from the secondary battery 100.

The determination device 40 stores, for example, "(the voltage output from the secondary battery 100)÷2" as a voltage threshold value. The determination device 40 determines whether or not the read voltage value of the voltmeter 103 is greater than the stored voltage threshold value (Step S12).

At this time, when the read voltage value of the voltmeter 103 is smaller than the stored voltage threshold value, the determination device 40 determines that the vehicle-side switch 80 is not short-circuited (Step S12, NO). In this case, the determination device 40 outputs, to the charging device controller 60, a normality signal indicating that the vehicle-side switch 80 is not short-circuited. If the normality signal is input from the determination device 40, the charging device controller 60 outputs the normality signal to the ground-side communication unit 70a.

If the normality signal is input from the charging device controller 60, the ground-side communication unit 70a transmits the normality signal to the vehicle-side communication unit 70b. If the normality signal is received from the ground-side communication unit 70a, the vehicle-side communication unit 70b outputs the normality signal to the host controller 120. If the normality signal is received from the vehicle-side communication unit 70b, for example, the host controller 120 turns on a normality lamp indicating that the vehicle-side switch 80 of the operation panel 130 is not short-circuited (Step S13). At this time, the electric charge of the capacitor 102 is in a state of having been discharged through the ground-side switch 30 and the resistor 20.

In this way, the determination result of the determination device 40 is notified to the driver, and the processing for determining whether or not the vehicle-side switch 80 is short-circuited ends.

In the processing of Step S12, when the read voltage value of the voltmeter 103 is greater than the stored voltage threshold value, the determination device 40 determines that the vehicle-side switch 80 is short-circuited (Step S12, YES).

Next, a processing flow in the vehicle charging system 200 when the determination device 40 determines that the vehicle-side switch 80 is short-circuited will be described.

In the processing of Step S12, when the determination device 40 determines that the vehicle-side switch 80 is short-circuited, the determination device 40 outputs an abnormality signal indicating that the vehicle-side switch 80 is short-circuited (a command signal for separating the secondary battery 100) to the charging device controller 60. If the abnormality signal is input from the determination device 40, the charging device controller 60 outputs the ground-side switch open control signal to the ground-side switch 30. The charging device controller 60 outputs the abnormality signal to the ground-side communication unit 70a.

The ground-side switch 30 is placed in the open state according to the ground-side switch open control signal input from the charging device controller 60 (Step S14).

If the abnormality signal is input from the charging device controller 60, the ground-side communication unit 70a transmits the abnormality signal to the vehicle-side communication unit 70b. If the abnormality signal is received from the ground-side communication unit 70a, the vehicle-side communication unit 70b outputs the abnormality signal to the host controller 120. If the abnormality signal is received from the vehicle-side communication unit 70b, for example, the host controller 120 turns on an abnormality lamp indicating that the vehicle-side switch 80 of the operation panel 130 is short-circuited (Step S15). In this way, the determination result of the determination device 40 is notified to the driver.

If the abnormality signal is received from the vehicle-side communication unit 70b, the host controller 120 (a control device which performs control for separating the secondary battery 100) outputs an interruption control signal for instructing interrupting of the interrupter 180 to the interrupter 180. The host controller 120 outputs, to the vehicle-side communication unit 70b, an interruption control completion signal indicating that the control for interrupting the interrupter 180 has been performed, along with the output of the control signal.

The interrupter 180 interrupts the host device if an interruption control signal is input from the host controller 120 (Step S16).

If the interruption control completion signal is input from the host controller 120, the vehicle-side communication unit 70b transmits the interruption control completion signal to the ground-side communication unit 70a. If the interruption control completion signal is received from the vehicle-side communication unit 70b, the ground-side communication unit 70a outputs the interruption control completion signal to the charging device controller 60. If the interruption control completion signal is received from the ground-side communication unit 70a, the charging device controller 60 outputs the ground-side switch close control signal to the ground-side switch 30. The ground-side switch 30 is placed in the closed state according to the ground-side switch close control signal input from the charging device controller 60 (Step S17). At this time, the resistor 20 discharges the electric charge of the capacitor 102 through the ground-side switch 30 (Step S18).

In Step S12, it is determined whether or not the voltage value of the voltmeter 103 read by the determination device 40 is greater than the stored voltage threshold value, and short-circuiting of the vehicle-side switch 80 is determined based on the determination result. However, the determination device 40 may determine short-circuiting of the vehicle-side switch 80 based on whether or not the voltage value of the voltmeter 103 decreases within a predetermined time. In Step S12, the determination regarding short-circuiting of the vehicle-side switch 80 by the determination device 40 may be performed based on the current value of the ammeter 104.

Discharging of the electric charge of the capacitor 102 in Step S18 may be natural discharging. In this case, the operation panel 130 continues to turn on the abnormality lamp until the voltage value of the voltmeter 103 acquired by the determination device 40 is equal to or less than the voltage threshold value stored in the determination device 40.

A signal transmitted and received between the ground-side communication unit 70a and the vehicle-side communication unit 70b described in the description of the processing flow is a command signal.

Although the processing flow of the vehicle charging system 200 of the first embodiment has been described, according to the processing of the charging device 1 described above, it is possible to detect short-circuiting of the vehicle-side switch 80, to reduce manufacturing costs of the vehicle 2, to improve fuel efficiency, and to enlarge the space inside the vehicle 2. Furthermore, according to the processing of the charging device 1 described above, when the charging device 1 detects short-circuiting of the vehicle-side switch 80, the vehicle 2 can appropriately separate the pantograph 90 as a contact intermediating the connection of the charger 10 and the secondary battery 100 from the secondary battery 100.

Next, a second embodiment will be described.

Figure 4:
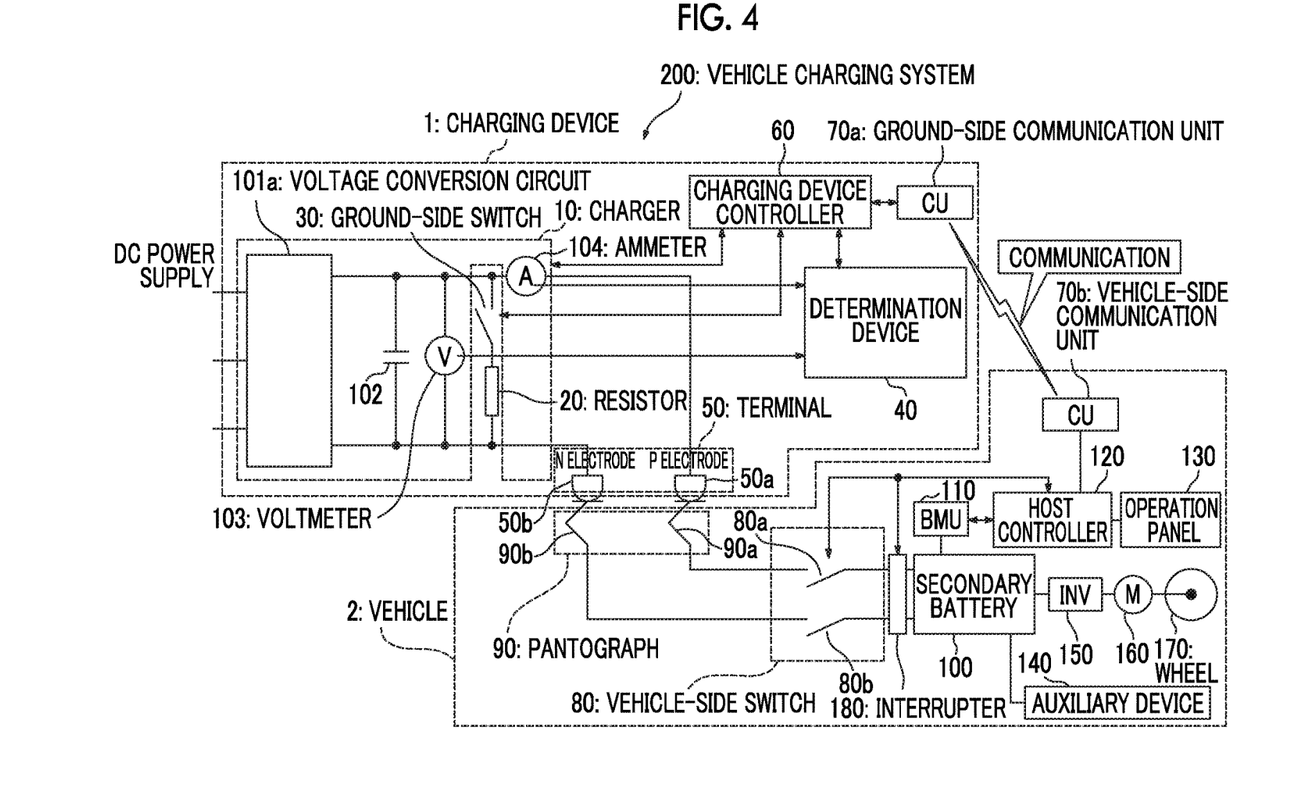
FIG. 4 is a diagram showing an example of the configuration of a charging device and a vehicle according to a second embodiment of the invention.

FIG. 4 is a diagram showing an example of the configuration of a charging device 1 and a vehicle 2 according to a second embodiment of the invention.

The vehicle 2 of the second embodiment shown in FIG. 4 has the same configuration as the vehicle 2 of the first embodiment. The charging device 1 of the second embodiment has the same configuration as the charging device 1 of the first embodiment, except that a voltage conversion circuit 101a is different from the voltage conversion circuit 101.

Here, the voltage conversion circuit 101a of the charging device 1 of the second embodiment will be described.

The voltage conversion circuit 101a of the charging device 1 of the second embodiment converts an input DC voltage to a desired DC voltage. The voltage conversion circuit 101a outputs the converted DC voltage through the terminal 50a and the terminal 50b. For example, the voltage conversion circuit 101a is a DC boosting/deboosting chopper circuit, and converts a voltage output from a DC voltage source to a DC voltage for charging the secondary battery 100.

As described above, according to the processing of the charging device 1 of the second embodiment, it is possible to detect short-circuiting of the vehicle-side switch 80, to reduce manufacturing costs of the vehicle 2, to improve fuel efficiency, and to enlarge the space inside the vehicle 2. Furthermore, according to the processing of the charging device 1 described above, when the charging device 1 detects short-circuiting of the vehicle-side switch 80, the vehicle 2 can appropriately separate the pantograph 90 as a contact intermediating the connection of the charger 10 and the secondary battery 100 from the secondary battery 100.

In this embodiment, the switch may be any switch as long as the switch appropriately operates. For example, the switch may be a transmission gate using a transistor.

As above, the charging device 1, the vehicle 2, and the vehicle charging system 200 according to the embodiment of the invention have been described.

The charging device 1 according to the embodiment of the invention includes the charger 10, the resistor 20, the ground-side switch 30, and the determination device 40. The charger 10 charges the secondary battery 100 of the vehicle 2. The resistor 20 is connected in parallel with the charger 10. The ground-side switch 30 connects the charger 10 and the resistor 20 in an openable/closable manner. The determination device 40 acquires information indicating that the ground-side switch 30 is closed and the vehicle-side switch 80 connecting the secondary battery 100 and the charger 10 in an openable/closable manner is open, and then determines that the vehicle-side switch 80 is short-circuited when a physical quantity relating to electricity of the resistor 20, that is, a voltage and a current are not decreased.

With this, it is possible to detect short-circuiting of the vehicle-side switch 80, to reduce manufacturing costs of the vehicle 2, to improve fuel efficiency, and to enlarge the space inside the vehicle 2.

While the embodiment of the invention has been described, the charging device 1 and the vehicle 2 described above have an internal computer system. Then, the procedure of the processing described above is stored in a computer-readable recording medium in the format of a program, and the program is read and executed by the computer, whereby the above-described processing is performed. The computer-readable recording medium refers to a magnetic disk, a magneto-optical disk, a CD-ROM, a DVD-ROM, a semiconductor memory, or the like. The computer program may be distributed to a computer through a communication line, and the computer to which the program is distributed may execute the program.

The program may realize a part of the functions described above. In addition, the program may be a file capable of realizing the functions in cooperation with a program recorded in the computer system in advance, a so-called differential file (differential program).

Although a few embodiments of the invention have been described, the embodiments are only for illustration and are not intended to limit the scope of the invention. Various omissions, substitutions, and modifications can be made without departing from the spirit of the invention.

INDUSTRIAL APPLICABILITY

According to the charging device, the vehicle, the vehicle charging system, the charging method, and the program described above, it is possible to detect short-circuiting of the vehicle-side switch, to reduce manufacturing costs of the vehicle, to improve fuel efficiency, and to enlarge the space inside the vehicle.

REFERENCE SIGNS LIST

1: charging device
2: vehicle
10: charger
20: resistor
30: ground-side switch
40: determination device
50: terminal
50a: terminal (P electrode)
50b: terminal (N electrode)
60: charging device controller
70a: ground-side communication unit
70b: vehicle-side communication unit
80, 80a, 80b: vehicle-side switch
90, 90a, 90b: pantograph
100: secondary battery
101: voltage conversion circuit
102: capacitor
103: voltmeter
104: ammeter
110: battery management unit
120: host controller
130: operation panel
140: auxiliary device
150: drive inverter
160: drive motor
170: wheels
180: interrupter

The invention claimed is:

1. A charging device comprising:
a charger which charges a secondary battery of a vehicle;
a resistor which is connected in parallel with the charger;
a ground-side switch which connects the charger and the resistor in an openable and closable manner; and
a determination device which is configured to acquire information indicating that the ground-side switch is closed and information indicating that a vehicle-side switch connecting the secondary battery and the charger in an openable and closable manner is open, and then determines that the vehicle-side switch is short-circuited when a physical quantity relating to electricity of the resistor does not decrease, wherein
the determination device outputs a command signal for separating a contact intermediating the connection of the charger and the secondary battery from the secondary battery when in response to the vehicle-side switch being short-circuited.

2. The charging device according to claim 1,
wherein the charger includes
a voltage conversion circuit which converts an AC voltage to a DC voltage, and
a capacitor which smoothes the DC voltage converted by the voltage conversion circuit.

3. The charging device according to claim 1,
wherein the charger includes
a voltage conversion circuit which converts a DC voltage to a DC voltage different from this DC voltage, and
a capacitor which smoothes the DC voltage converted by the voltage conversion circuit.

4. A vehicle charging system comprising:
a charging device including
a charger which charges a secondary battery of a vehicle,
a resistor which is connected in parallel with the charger,
a ground-side switch which connects the charger and the resistor in an openable and closable manner, and
a determination device which is configured to acquire information indicating that the ground-side switch is closed and information indicating that a vehicle-side switch connecting the secondary battery and the charger in an openable and closable manner is open, and then determines that the vehicle-side switch is short-circuited when a physical quantity relating to electricity of the resistor does not decrease; and
the vehicle including a control device which is configured to separate the secondary battery of the vehicle when the determination device determines that the vehicle-side switch of the vehicle is short-circuited.

5. The vehicle according to claim 4, further comprising:
a communication unit which is configured to perform communication with a communication unit of the charging device; and
a battery management unit which is configured to manage the secondary battery;
wherein the control device is configured to output a control signal to the battery management unit based on a command signal received by the communication unit.

6. A charging method for a charging device,
wherein the charging device includes
a charger which charges a secondary battery of a vehicle,
a resistor which is connected in parallel with the charger, and
a ground-side switch which connects the charger and the resistor in an openable and closable manner, and
the charging method comprises:
acquiring information indicating that the ground-side switch is closed and information indicating that a vehicle-side switch connecting the secondary battery and the charger in an openable and closable manner is open, and then determining that the vehicle-side switch is short-circuited when a physical quantity relating to electricity of the resistor does not decrease; and
separating the secondary battery of the vehicle in response to determining that the vehicle-side switch is short-circuited.

7. A computer program product including programmed instructions embodied in and stored on a non-transitory computer readable medium for a charging device, wherein the charging device includes a charger for charging a secondary battery of a vehicle, a resistor which is connected in parallel with the charger, and a ground-side switch which connects the charger and the resistor in an openable and closable manner, wherein the instructions, when executed by a computer, cause the computer to perform:
acquiring information indicating that the ground-side switch connecting the charger for charging the secondary battery of the vehicle and the resistor connected in parallel with the charger in the openable and closable manner is closed and a vehicle-side switch connecting the secondary battery and the charger in an openable and closable manner is open; and
determining that the vehicle-side switch is short-circuited when a physical quantity relating to electricity of the resistor does not decrease; and
separating the secondary battery of the vehicle in response to determining that the vehicle-side switch is short-circuited.

* * * * *